April 2, 1929.  C. E. SARGENT  1,707,235
WINDMILL GENERATOR
Filed Jan. 22, 1925
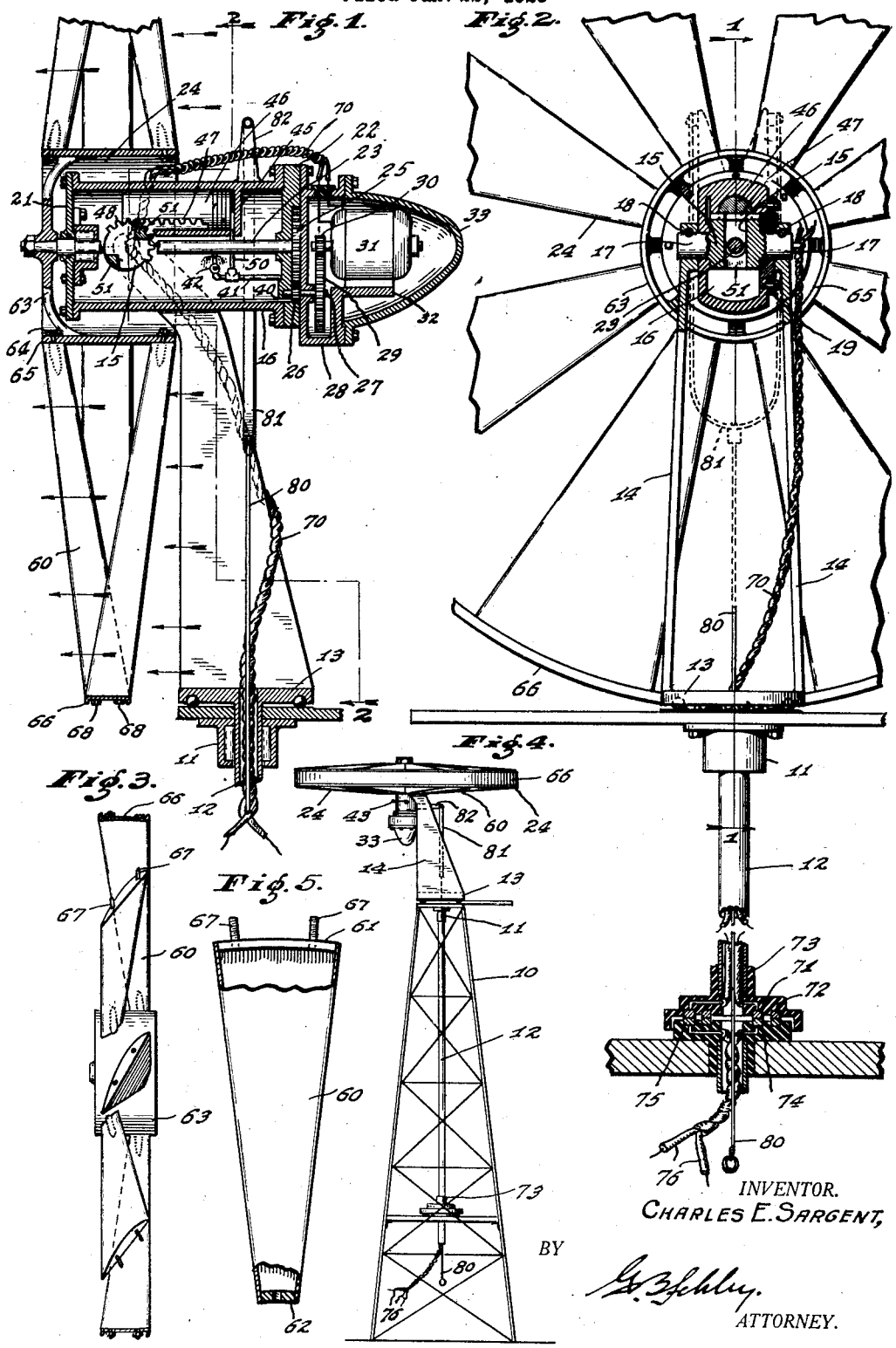
INVENTOR.
CHARLES E. SARGENT,
BY
ATTORNEY.

Patented Apr. 2, 1929.

1,707,235

UNITED STATES PATENT OFFICE.

CHARLES ELLIOTTE SARGENT, OF ELGIN, ILLINOIS.

WINDMILL GENERATOR.

Application filed January 22, 1925. Serial No. 3,946.

It is the object of my invention to produce a wind driven electric generator which generator will be governed so that its velocity of rotation will never exceed a predetermined rate. A further object of my invention is the provision of a lubricating system preferably combined with the governing device. A still further object of my invention is the production of a new and useful type of wind wheel which may be simply and cheaply constructed and which will possess a marked improvement in efficiency over wind wheels of the types heretofore in use.

I accomplish the above objects by pivotally mounting my wind wheel and generator as a unit on a horizontal axis, and I provide hydraulic means for tilting this unit about such horizontal axis in accordance with changes of wind velocity in order that the velocity of the generator may be kept substantially constant and will not exceed a predetermined maximum; and to provide for lubrication, I utilize the pressure generated in the hydraulic governing device to supply oil to the moving parts of the generator.

The accompanying drawing illustrates my invention: Fig. 1 is a vertical central section through the wind-wheel generator unit on the line 1—1 of Fig. 2; Fig. 2 is a section on the line 2—2 of Fig. 1 illustrating the method by which the wind-wheel generator is supported; Fig. 3 is a view illustrating the construction of the wind-wheel itself; Fig. 4 is a side elevation of the wind-wheel and its supporting tower with the wind wheel manually moved to a position in which it is inoperative; and Fig. 5 is a detail view illustrating the construction of the blades of the wind wheel.

My wind driven electric generator may conveniently be mounted on a tower 10 provided with one or more bearings 11 for the support of a vertically extending hollow shaft 12. Rigidly connected to the upper end of the shaft 12 is the base 13 from which there extend vertically two uprights 14 serving to support the wind-wheel generator unit. Extending between the upper ends of the supports 14 is a trunnion 15 upon which is rotatably mounted the wind-wheel generator unit.

The trunnion 15 extends laterally through a casing 16 and is provided at its ends with two cylindrical bosses 17 which extend through the walls of the casing 16 and are rigidly mounted in the upper ends of the supports 14. The mounting of the trunnion bosses 17 and the supports 14 may be of any character desired, but I have illustrated the supports 14 as being provided with pins or keys 18 which engage grooves in the trunnion bosses 17 and effectively prevent such trunnion bosses from turning relative to the supports 14. To facilitate assembly, one wall of the casing 16 is provided with a removable plate 19 at the point where the trunnion boss passes through that wall.

The casing 16 is provided with end plates 21 and 22 in each of which there is provided a bearing for the wind wheel shaft 23. Such bearing may be either a plain bearing as in the cover plate 22 or an anti-friction bearing as in the cover plate 21. Desirably, at least one of these bearings is a thrust bearing. The shaft 23 extends outward beyond the cover plate 21, and on such projecting end there is rigidly mounted in any convenient manner the wind-wheel 24. Rigidly mounted on the other end of the shaft 23 is a gear 25 meshing with a second and preferably smaller gear 26 carried by a shaft 27 extending through the base plate 28 of the generator housing. The shaft 27 is provided with a gear 29 meshing with a gear 30 on the shaft of the generator 31. The generator 31 may conveniently be mounted on a shelf 32 which may be integral with the base plate 28. A cap 33, bolted to the base plate 28, serves to enclose the the generator 31. I prefer to make the gears 25, 26, 29, and 30 of such relative diameters that the generator will be rotated approximately 40 times when the wind-wheel rotates once, although such ratio may be varied as desired.

The gears 25 and 26 are closely enclosed, as by being located in recesses in the cover plate 22. By thus enclosing these gears, they may act as a gear pump for providing a positive lubrication of the moving parts. To this end, a small passage 40 connects the gear recesses with the interior of the casing 16, this passage 40 serving as the inlet of the gear pump. The outlet from the gear pump formed by the gears 25 and 26 is connected to an outlet pipe 41 in which there is placed a valve 42 controlled by a handle 43 on the outside of the casing 16. As the wind-wheel revolves and the gears 25 and 26 are driven, the gears 25 and 26 operate to withdraw oil from the lower portion of the casing 16 and to force it through the pipe 41 from the end of which it emerges in the form of a spray which effectively lubricates all the working parts within the casing 16.

The casing 16 is provided with a cylinder 45 within which a piston 46 is slidable. The end of the piston 46 extends beyond the end of the cylinder 45 and is provided with rack teeth 47 which engage gear teeth 48 formed on the middle portion of the trunnion 15. The closed end of the cylinder 45 is connected by a pipe 50 with the outlet pipe 41 of the gear pump, the point of connection of the pipes 50 and 41 being between the gear pump and the control valve 42, so that the amount of the hydraulic pressure in the cylinder 45 will depend on the velocity of rotation of the wind-wheel and upon the setting of the valve 42. As the piston 46 is connected to the trunnion 15 by the teeth 47, the pressure within the cylinder 45 will act on the head of such cylinder to tend to cause rotation of the wind-wheel generator unit in a clockwise direction (Fig. 1).

In the construction of my device as illustrated, the shaft 23 and the trunnion bosses 17 are coplanar. As I prefer to make the trunnion 15 in one piece, it becomes necessary to cut away the central portion of the trunnion in order to permit rotation of the wind-wheel generator unit about the axis of the trunnion bosses 17. As shown, the central portion of the trunnion is cut away leaving the two end portions connected together by arms 51. If desired, the shaft 23 may be located either above or below the trunnion 15 and the necessity for cutting away the central portion of the trunnion eliminated; but in order to economize on space I prefer to employ the construction illustrated.

The wind-wheel 24 is displaced a considerable distance from the axis of the vertical shaft 12 so that the wheel will always be on the leeward side of the shaft 12. Thus, the necessity for the customary tail is eliminated, as the wind-wheel will always swing about the axis of the shaft 12 until it is transverse to the wind.

Although any type of wind-wheel may be used, I prefer to employ the construction illustrated in the drawings, as by so doing I am enabled to make the wind-wheel vanes of aerofoil cross section and thus materially increase their efficiency. The wind-wheel vanes 60 may be made of sheet metal bent to aerofoil shape and secured at each end around forms 61 and 62. The inner ends of the vanes 60 are attached to the wind-wheel hub 63 as by bolts 64 which pass through the hub flange 65 into the inner vane-forms 62. A rim 66, conveniently channel-shaped in cross-section, surrounds and is attached to the outer ends of the vanes 60. The method of attachment of the vanes 60 to the rim 66 may be any desired method, but I have illustrated studs 67 set in the outer vane-form 61 and passing through the rim 66 to receive nuts 68. The inner ends of the vanes 60 are staggered as illustrated in Figs. 1 and 3 to provide for bracing the wind-wheel in an axial direction. Vanes so constructed and mounted act in tension to support the wind-wheel in a manner similar to the wire spokes of a bicycle wheel.

Wires 70 passing through the generator housing and downward through the hollow shaft 12 serve to connect the generator with a pair of slip rings 71 and 72 rigidly supported from the shaft 12 in a base 73 of insulating material. Brushes 74 and 75 bear respectively against the slip rings 71 and 72 and are connected to the wires 76 through which current may be supplied to any desired location.

To render the wind-wheel generator inoperative when desired, I provide a wire or cable 80, extending upward through the shaft 12, above the end of which it is joined to a yoke or bail 81, the two arms of which extend upwardly on opposite sides of the casing 16 with their upper ends joined to arms 82 extending upwardly from such casing. The trunnion 15 is so located longitudinally of the wind wheel generator unit that the center of gravity of the unit is to the left (Fig. 1) of the axis of the trunnion bosses 17. Thus, the wind wheel generator unit tends to rotate in a counterclockwise direction from the position shown in Fig. 1, but such rotation is prevented by any convenient stop. Such a stop does not prevent the rotation of the wind-wheel generator unit in a clockwise direction from the position illustrated in Fig. 1, and it is thus possible by pulling the wire or cable 80 downward to tilt the wind-wheel from the position illustrated in Fig. 1 to the position shown in Fig. 4 where it will be inoperative.

With the wind-wheel in operation, the generator is driven through the gears 26, 27, 29, and 30. The gears 25 and 26, operating as a fluid pump as above described, draw oil from the casing 16 and discharge it through the pipe 41. The hydraulic pressure generated by the gear pump will be transmitted through the pipes 41 and 50 to the interior of the cylinder 45 and will tend to tilt the wind wheel generator unit in a clockwise direction (Fig. 1) as above described. This tendency to tilt is in opposition to the influence of gravity which tends to tilt the wind-wheel in a counterclockwise direction. By adjusting the valve 42 the tendency of the pressure within the cylinder 45 to tilt the wind-wheel generator unit can be regulated, so that should the wind wheel speed exceed a desired maximum the unit will be tilted against the influence of gravity, and such tilting will result in decreasing the effective area of the wind-wheel and the consequent lessening of its speed. Thus, a governing action is obtained; for should the wind velocity increase, the hydraulic pressure within the cylinder 45 is increased and the wind wheel tilted to present less area to the wind, and should the wind velocity decrease, the reverse series of effects takes place.

My aerofoil blades are distinguished in their arrangement and disposition from the aerofoil blades of an air propeller. In an air propeller, the flatter surface of each blade strikes the air as the propeller is rotated in such a direction that the thicker edge of the blade leads. Therefore, if such a propeller is rotated by an axial air current striking the flatter sides of its blades, the direction of rotation will be such that the thinner edges of the blades will lead. In my wind-wheel, as is evident from Fig. 3, the air flowing from the right strikes the flatter surfaces of the blades and rotates the wind-wheel in such a direction that the thicker edges of the blades will lead.

I claim as my invention:

1. In combination, a wind-wheel support pivotally mounted on a horizontal axis, a wind-wheel rotatably mounted on said support on an axis tranverse to the axis of pivotal mounting of said support, and governing means driven by said wind-wheel and acting to tilt said support to maintain constant the velocity of rotation of said wind-wheel.

2. In combination, a pivotally mounted wind-wheel support, a wind-wheel rotatable in said support, a pump driven from said wind-wheel, a supply of liquid for said pump, said pump having a restricted discharge outlet, and means responsive to the pressure generated by said pump for swinging said wind-wheel support about its axis of pivotal mounting to maintain constant the velocity of rotation of said wind-wheel.

3. In combination, a pivotally mounted wind-wheel support, a wind-wheel rotatable in said support, a pump driven from said wind-wheel, a supply of liquid for said pump, and means responsive to the pressure generated by said pump for swinging said wind-wheel support about its axis of pivotal mounting to maintain constant the velocity of rotation of said wind-wheel.

4. In combination, a member rotatable about a vertical axis, a wind-wheel support pivotally mounted on said member, a wind-wheel rotatable in said support, a pump driven from said wind-wheel, a supply of liquid for said pump, a cylinder carried by said wind-wheel support and connected to the discharge outlet of said pump, and a piston in said cylinder, said piston being connected to said rotatable member to cause said wind-wheel support to swing about its axis of pivotal mounting to maintain constant the velocity of rotation of said wind-wheel.

5. The combination set forth in claim 3, with the addition of a casing carried by said support, and a spray-nozzle located in said casing and connected to the discharge opening of said pump.

In witness whereof, I have hereunto set my hand at Elgin, Illinois, this 17th day of January, A. D. one thousand nine hundred and twenty five.

CHARLES ELLIOTTE SARGENT.